US009146901B2

(12) United States Patent
Nystad (10) Patent No.: US 9,146,901 B2
(45) Date of Patent: Sep. 29, 2015

(54) VECTOR FLOATING POINT ARGUMENT REDUCTION

(75) Inventor: Jorn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 968 days.

(21) Appl. No.: 13/137,576

(22) Filed: Aug. 26, 2011

(65) Prior Publication Data

US 2012/0078987 A1 Mar. 29, 2012

(30) Foreign Application Priority Data

Sep. 24, 2010 (GB) .................................. 1016071.1

(51) Int. Cl.
*G06F 17/10* (2006.01)
*G06F 7/483* (2006.01)
*G06F 7/552* (2006.01)
*G06F 5/01* (2006.01)
*G06F 9/30* (2006.01)

(52) U.S. Cl.
CPC ................ *G06F 17/10* (2013.01); *G06F 7/483* (2013.01); *G06F 7/5525* (2013.01); *G06F 9/30036* (2013.01); *G06F 5/012* (2013.01); *G06F 2207/5521* (2013.01)

(58) Field of Classification Search
USPC .................. 708/495–499, 501–502, 550–603; 712/2, 7–10, 16, 22
See application file for complete search history.

(56) References Cited

U.S. PATENT DOCUMENTS

| 5,463,574 | A | 10/1995 | Desrosiers et al. |
| 5,563,818 | A | 10/1996 | Agarwal et al. |
| 5,619,439 | A | 4/1997 | Yu et al. |
| 5,973,705 | A | 10/1999 | Narayanaswami |
| 6,247,117 | B1 * | 6/2001 | Juffa ............................ 712/222 |
| 6,614,431 | B1 | 9/2003 | Collodi |

(Continued)

FOREIGN PATENT DOCUMENTS

| JP | 11-24887 | 1/1999 |
| JP | 2001-175455 | 6/2001 |

(Continued)

OTHER PUBLICATIONS

Intel, "IA-32 Intel Architecture Software Developer's Manual," vol. 2A, Order No. 253666-017, Sep. 2005, retrieved from http://www.scs.stanford.edu/05au-cs240c/lab/ia32/IA32-2A.pdf.*

(Continued)

*Primary Examiner* — Chuong D Ngo
*Assistant Examiner* — Matthew Sandifer
(74) *Attorney, Agent, or Firm* — Nixon & Vanderhye P.C.

(57) ABSTRACT

A processing apparatus is provided with processing circuitry 6, 8 and decoder circuitry 10 responsive to a received argument reduction instruction FREDUCE4, FDOT3R to generate control signals 16 for controlling the processing circuitry 6, 8. The action of the argument reduction instruction is to subject each component of an input vector to a scaling which adds or subtracts an exponent shift value C to the exponent of the input vector component. The exponent shift value C is selected such that a sum of this exponent shift value C with the maximum exponent value B of any of the input vector components lies within a range between a first predetermined value and a second predetermined value. A consequence of execution of this argument reduction instruction is that the result vector when subject to a dot-product operation will be resistant to floating point underflows or overflows.

17 Claims, 8 Drawing Sheets

(56) References Cited

U.S. PATENT DOCUMENTS

| | | | |
|---|---|---|---|
| 6,734,874 B2* | 5/2004 | Lindholm et al. | 345/643 |
| 6,996,597 B2* | 2/2006 | Mathur et al. | 708/550 |
| 2001/0011291 A1* | 8/2001 | Arakawa et al. | 708/495 |
| 2003/0112246 A1 | 6/2003 | Lindholm et al. | |
| 2004/0113911 A1* | 6/2004 | Collodi | 345/426 |
| 2006/0101242 A1 | 5/2006 | Siu et al. | |
| 2008/0263335 A1 | 10/2008 | Hayes | |
| 2009/0112955 A1* | 4/2009 | Kershaw et al. | 708/201 |
| 2010/0262722 A1* | 10/2010 | Vauthier et al. | 710/8 |

FOREIGN PATENT DOCUMENTS

| | | |
|---|---|---|
| JP | 2006-65633 | 3/2006 |
| JP | 2007-79696 | 3/2007 |

OTHER PUBLICATIONS

International Search Report and Written Opinion of the International Searching Authority mailed Sep. 12, 2011 in PCT/GB2011/050497.
A. Ayad et al, "Multi-Prover Verification of Floating-Point Programs" Automated Reasoning, vol. 6173, Jul. 2010, pp. 127-141.
UK Search Report for GB Application No. 1016071.1, dated Jan. 14, 2011.
PCT Search Partial Search Report for PCT/GB2011/050497, dated Jun. 29, 2011.
Jeannerod, C-P et al., "Optimizing correctly-rounded reciprocal square roots for embedded VLIW cores", Signals, Systems and Computers, (Nov. 1, 2009), pp. 731-735.
Fowler, D.L. et al., "An accurate, high speed implementation of division by reciprocal approximation", Computer Arithmetic, (Sep. 6, 1989), pp. 60-67.
Chen, S-Y et al., "Design and Implementation of a 64/32-bit Floating-point Division, Reciprocal, Square root, and Inverse Square root Unit", Solid-State and Integrated Circuit Technology, (2006), pp. 1976-1979.
Reference Guide R700-Family Instruction Set Architecture, (Mar. 2009), 336 pages.
AMD R600 Technology—R600-Family Instruction Set Architecture, (May 2007), 342 pages.
Ambrash, M., A First Look at the Larrabee New Instruction (LRBni), Architecture & Design, (Apr. 1, 2009), 41 pages.
NVIDIA Corporation, "NV_gpu_program4", No. 322, (Dec. 14, 2009), 104 pages.
IBM, Synergistic Processor Unit—Instruction Set Architecture (Version 1.2), (Jan. 27, 2007), 281 pages.
Yang, X. et al., PLX FP: An Efficient Floating-Point Instruction Set for 3D Graphics (2004), Proceedings of the 2004 IEEE International Conference on Multimedia and Expo, (2004), 2 pages.
U.S. Appl. No. 13/825,179, filed Mar. 20, 2013, Craske et al.
Japanese Office Action dated Nov. 25, 2014 in JP 2011-202971 and English translation, 8 pages.
Office Action mailed Jul. 21, 2015 in co-pending U.S. Appl. No. 13/825,179, 17 pages.
English translation of Chinese First Office Action issued Jul. 15, 2015 in CN 201110294485.6, 13 pages.
English translation of Taiwanese Office Action and Search Report issued Jul. 23, 2015 in TW 100130131, 5 pages.

* cited by examiner

FIG. 1

FREDUCE4 $(V_0, V_1, V_2, V_3)$ generates
$\Rightarrow 2^C v_0, 2^C v_1, 2^C v_2, 2^C v_3 \quad \binom{4*}{32\text{-bit FPs}}$ where B is a max exponent value among
$V_i$ and C is an integer such that:
$\quad\quad\quad$ B+C < 190 (Edotmax)
$\quad\quad\quad$ B+C > 64 (Edotmin)

FIG. 4

$18 \rightsquigarrow \tilde{v} \quad \Rightarrow \quad \tilde{v} \quad \sim 20$
$\qquad$ normalise $\quad$ norm $$= \frac{\tilde{v}}{|\tilde{v}|} \quad \sim 22$$

$24 \rightsquigarrow \quad = \dfrac{\tilde{v}}{\boxed{\sqrt{\tilde{v}.\tilde{v}}}} \quad \longleftarrow$ FP overflow or underflow hazard!

$$= \frac{2^c \tilde{v}}{\sqrt{\boxed{2^c \tilde{v}. 2^c \tilde{v}}}} \quad \longleftarrow \text{Scaled to be safe}$$

FDOT3R $(V_0, V_1, V_3)$ $\begin{pmatrix} 4* \\ 32\text{-bit FPs} \end{pmatrix}$ generates $\Rightarrow 2^c v_0, 2^c v_1, 2^c v_2, 2^c * 2^c (V_1^2 + V_2^2 + V_3^2)$ where B is max exponent value among
$V_i$ and C is an integer such that:
B+C < 190 (Edotmax)
B+C > 64 (Edotmin)

VECTOR FLOATING POINT ARGUMENT REDUCTION

This application claims priority to GB Application No. 1016071.1 filed Sep. 24, 2010, the entire contents of which are incorporated herein by reference.

BACKGROUND OF THE INVENTION

1. Field of the Invention

This invention relates to the field of data processing systems. More particularly, this invention relates to the field of data processing systems providing vector floating point arithmetic.

2. Description of the Prior Art

It is known to perform vector normalisation operations upon vector floating point vector V to generate a normalised vector that has length one and points in the same direction as the input vector V. This vector normalisation can be performed as the following sequence of calculations:

1. Given an input vector V, compute the dot-product of the input vector V with itself;
2. Compute the reciprocal square root of the dot-product; and
3. Multiply each component of the input vector V by the reciprocal square root value.

While the above sequence of mathematical operations works well for idealised mathematical real numbers, there is a problem that floating-point numbers only represent mathematical real numbers within a limited range and with a limited degree of precision. In particular problem in the context of the above described vector normalisation technique, the dot-product may overflow or underflow resulting in at least a loss of precision in the final result and potentially an unacceptable error.

One approach to addressing this problem would be to identify the vector component of the input vector V with the largest value, and then divide the other vector components by this value whilst setting the vector component with the largest value to a magnitude of one. The problem with this approach is that it introduces additional floating-point divisions which reduces processing speed and increases power consumption. Another approach to addressing this problem would be to perform the intermediate calculations within the vector normalisation procedure with a higher degree of precision than the input vector V (e.g. if the input vector V is a single-precision floating point number, then the intermediate calculations may be performed using double-precision floating point numbers). However, while this approach is robust, it again results in lower speed, higher power consumption and assumes that support for higher precision floating point arithmetic is available.

SUMMARY OF THE INVENTION

Viewed from one aspect the present invention provides apparatus for processing data comprising:
processing circuitry configured to perform processing operations upon data values; and
decoder circuitry coupled to said processing circuitry and configured to decode program instructions to generate control signals for controlling said processing circuitry to perform processing operations specified by said program instructions; wherein
said decoder circuitry is responsive to an argument reduction instruction to generate control signals to control said processing circuitry to perform a processing operation upon a vector floating point value having a plurality of components, each of said plurality of components including an integer exponent value and a mantissa value, said processing operation including generating a plurality of result components the same as given by:
identifying a highest integer exponent value B of said plurality of components;
selecting an exponent shift value C such that (B+C) is less than a first predetermined value $E_{dotmax}$ and (B+C) is greater than a second predetermined value $E_{dotmin}$, where said exponent shift value C is an integer value; and
for each of said plurality of components, if said exponent shift value C is non-zero, then adding said exponent shift value C to an integer exponent value of said component to generate one of said plurality of result components.

The present invention both recognises and addresses the above problem. The invention provides an argument reduction instruction which includes the generation of scaled vector components for which the exponent values have all been scaled by the same factor such that the largest of the component values after the scaling lies within a safe range. This safe range may be such that the largest component when multiplied by itself will neither overflow nor underflow the floating point representation being used (and with some longer vectors that the scalar product of all of the vectors will not overflow the floating point representation). Selection of the first predetermined value and the second predetermined value may thus be set to avoid such underflows or overflows. However, it is possible that the argument reduction instruction might be used to avoid other potential hazards for which different limit conditions may be associated with the first predetermined value and the second predetermined value.

In the case of a signed, single-precision floating point value where an offset of −127 is applied to the stored exponent value, then the first predetermined value may be set as 190 and the second predetermined value may be set as 64.

An underflow may occur within the result components of the argument reduction instruction. As an example, an input vector may contain one large vector component and two much smaller vector components. If the large vector component is scaled back to avoid an overflow when it is multiplied by itself, then it is possible that this scaling will result in an underflow in the smaller vector components. In this case, the vector components which have been subject to an underflow may be replaced with zero values. In practice the loss of precision associated with the underflow in the smaller vectors is negligible since the input vector is so heavily dominated by the large component, particularly when the dot-product of the normalised vector is considered.

It will be appreciated that there are many different ways in which the exponent shift value C may be selected so as to fall within the desirable range. It will also be appreciated that there is no single acceptable value for the exponent shift value C, rather there is a range of values which will be acceptable. It is desirable that implementations of the argument reduction instruction should incur a low level of circuit and power overhead. One example of such a desirable implementation is where for each of the components of the input vector a high order portion of the exponent value is extracted and then the highest of these high order exponent portions identified. The identified high order portion may then be subtracted from a predetermined value that is a factor of two smaller than the highest possible high order portion to produce a value which is then added to each of the high order portions for each of the components. This technique is computationally simple and may be implemented with relatively little circuit and power overhead while meeting the requirements of providing an exponent shift value lying between the first predetermined value and the second predetermined value.

If when utilising this implementation the result of adding the derived value to any of the high order portions results in an underflow in the resulting high order portion and the value which was added is negative, then this may be dealt with at an appropriate level of precision by replacing a corresponding one of the result components with a value of zero.

In order to improve the robustness of the argument reduction instruction, it is desirable that it have well defined and appropriate behaviour in response to any of the components forming the input floating point vector being either a not-a-number component or an infinity value. If any of the plurality of components is a floating point not-a-number, then the argument reduction instruction generates a result in which all of the result components are set to be floating point not-a numbers. If any of the components of the input floating point vector is a floating point infinity value, then the argument reduction instruction produces a result setting any component corresponding to an infinity component to a value with a magnitude of one and a sign matching that of the sign of the floating point infinity while all the remaining result components which do not correspond to infinity values are set to have a floating point value with a magnitude of zero.

It will be appreciated that as well as generating result components which are appropriately scaled from the input components, the argument reduction instruction may also produce other result values. A particular implementation may have additional result channels available to carry additional results from an argument reduction instruction other than the result components and these additional results may improve the overall processing efficiency if they can avoid the need for executing another instruction. One example of such a situation is when the argument reduction instruction also generates a result scalar produce with a value the same as given by a scalar product of the plurality of result components.

As previously mentioned, one example use case for the argument reduction instruction is when generating a normalised vector floating point value formed of a plurality of normalised components. The argument reduction instruction facilitates this by generating its result components with the argument reduction instruction then being followed by a sequence of one or more further instructions which serve to generate a result scalar product with a value the same as given by a scalar product of the result component; generate a reciprocal square root of the scalar product; and for each result component, generate a corresponding normalised result component by multiplying the result component by the reciprocal square root.

While the argument reduction instruction could be provided in any form of processing apparatus, such as a general purpose processor, it has particular utility within a graphics processing unit where vector normalisation is often required.

Viewed from another aspect the present invention provides apparatus for processing data comprising:

processing means for performing processing operations upon data values; and decoder means for decoding program instructions to generate control signals for controlling said processing circuitry to perform processing operations specified by said program instructions; wherein said decoder means is responsive to an argument reduction instruction to generate control signals to control said processing means to perform a processing operation upon a vector floating point value having a plurality of components, each of said plurality of components including an integer exponent value and a mantissa value, said processing operation including generating a plurality of result components the same as given by:

identifying a highest integer exponent value B of said plurality of components;

selecting an exponent shift value C such that (B+C) is less than a first predetermined value $E_{dotmax}$ and (B+C) is greater than a second predetermined value $E_{dotmin}$, where said exponent shift value C is an integer value; and for each of said plurality of components, if said exponent shift value C is non-zero, then adding said exponent shift value C to an integer exponent value of said component to generate one of said plurality of result components.

Viewed from a further aspect the present invention provides a method of processing data comprising the step of:

in response to an argument reduction instruction, performing a processing operation upon a vector floating point value having a plurality of components, each of said plurality of components including an integer exponent value and a mantissa value, said processing operation including generating a plurality of result components the same as given by:

identifying a highest integer exponent value B of said plurality of components;

selecting an exponent shift value C such that (B+C) is less than a first predetermined value $E_{dotmax}$ and (B+C) is greater than a second predetermined value $E_{dotmin}$, where said exponent shift value C is an integer value; and for each of said plurality of components, if said exponent shift value C is non-zero, then adding said exponent shift value C to an integer exponent value of said component to generate one of said plurality of result components.

Viewed from a further aspect the present invention provides a computer program product having a non-transitory form and storing a computer program for controlling a data processing apparatus to perform data processing in response to program instructions, wherein said computer program includes an argument reduction instruction for controlling said data processing apparatus to perform a processing operation upon a vector floating point value having a plurality of components, each of said plurality of components including an integer exponent value and a mantissa value, said processing operation including generating a plurality of result components the same as given by:

identifying a highest integer exponent value B of said plurality of components;

selecting an exponent shift value. C such that (B+C) is less than a first predetermined value $E_{dotmax}$ and (B+C) is greater than a second predetermined value $E_{dotmin}$, where said exponent shift value C is an integer value; and for each of said plurality of components, if said exponent shift value C is non-zero, then adding said exponent shift value C to an integer exponent value of said component to generate one of said plurality of result components.

It will be appreciated that another class of possible implementations of the invention are virtual machine implementations in which a general purpose computer is controlled by software to provide a virtual machine execution environment which supports execution of the argument reduction instruction discussed above.

The above, and other objects, features and advantages of this invention will be apparent from the following detailed description of illustrative embodiments which is to be read in connection with the accompanying drawings.

DESCRIPTION OF THE EMBODIMENTS

Figure 1:
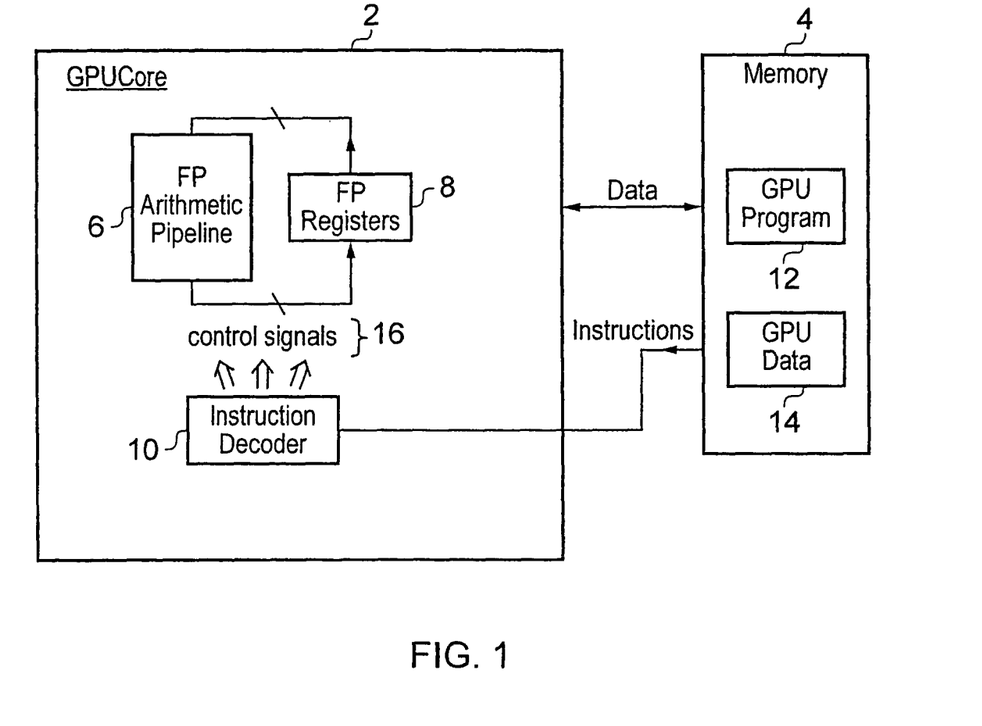
FIG. 1 schematically illustrates a graphics processing unit core supporting execution of an argument reduction instruction.

FIG. 1 shows a graphics processing unit core 2 coupled to a memory 4. The graphics processing unit core 2 includes a floating point arithmetic pipeline 6, a bank of floating point registers 8 and an instruction decoder 10. It will be appreciated that the illustration of the graphics processing unit core 2 in FIG. 1 is simplified and that in practice many further processing elements will be provided, such as, for example, load store pipelines, texturing pipelines, cache memories etc.

The memory 4 stores a graphics program 12 and graphics data 14. In operation, program instructions from the graphics program 12 are fetched by the graphics processing unit core 2 and supplied to the instruction decoder 10. The instruction decoder 10 decodes these program instructions and generates control signals 16 which are applied to the processing circuitry in the form of a floating point arithmetic pipeline 6 and the bank of floating point registers 8 to configure and control this processing circuitry 6, 8 to perform the desired processing operation specified by the program instruction concerned. This processing operation will be performed upon the data values from the graphics data 14 which are loaded to and stored from the bank of floating point registers 8 for manipulation by the floating point arithmetic pipeline 6.

As will be understood by those in this technique field, depending upon the program instruction received, the instruction decoder 10 will generate control signals 16 to configure the processing circuitry 6, 8 to perform a particular desired processing operation. These processing operations could take a wide variety of different forms, such as multiplies, additions, logical operations, vector variants of the preceding operations and others. In accordance with the present techniques, the instruction decoder 10 is responsive to argument reduction instructions fetched from the memory 4 as part of the graphics program 12 to perform processing operations as will be described below. It will be appreciated that the circuits which perform these desired processing operations can have a wide variety of different forms and the present technique encompasses all of these different forms. In particular, a result value described with reference to a particular sequence of mathematical operations could be generated by following a different set of mathematical operations which produce the same result value. These variants are included within the present techniques.

Figure 2:
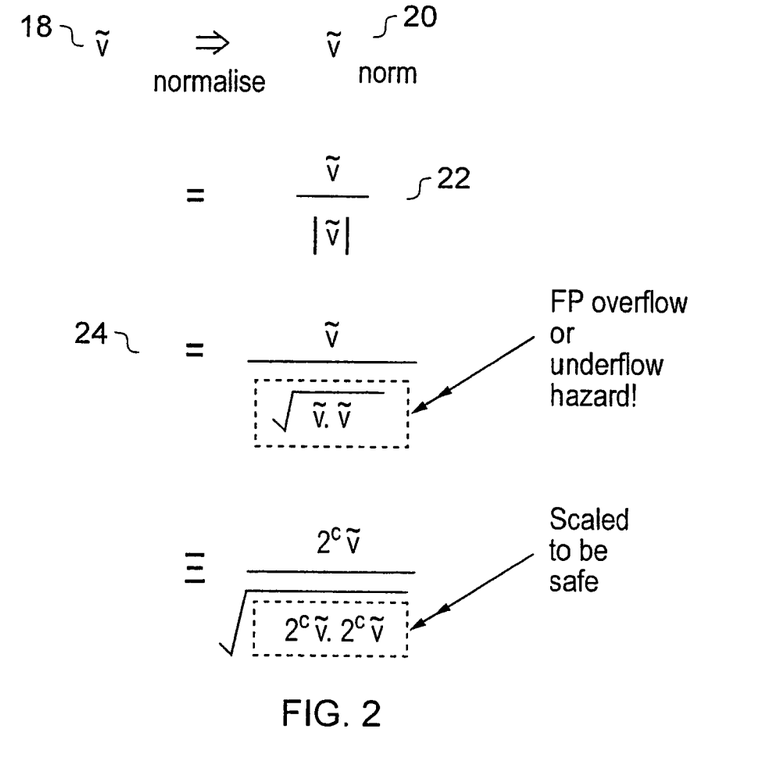
FIG. 2 illustrates a vector normalisation operation.

FIG. 2 illustrates a vector normalisation operation. An input vector 18 is to be subject to a normalisation operation to generate a normalised vector 20 with a magnitude of one. This may be achieved by dividing the input vector 18 by a magnitude of the input vector as illustrated in line 22. The magnitude of the input vector may in turn be calculated as the square root of the dot-product of the input vector 18. This is illustrated in line 24. A problem with this approach is that the dot-product of the input vector 18 may be subject to a floating point underflow or a floating point overflow. If either of these occur, then there is a potential for at least a loss of precision in the final result or an error resulting from the overflow or underflow.

The present techniques exploit the realisation that the numerator and denominator of the expression illustrated in line 24 will both be scaled by the same factor if the input vector is scaled. A mathematically convenient and low power, low overhead form of scaling which may be applied to the input vector 18 is a change in the exponent value corresponding to a scaling of the input vector 18 by a power of two. As this scaling has no effect upon the normalised vector 20, the scaling value selected can be such as to protect the dot-product from overflow or underflow. The exponent shift value C (a number added to or subtracted from the exponent value of all the input vector components) utilised can thus be selected within a range so as to ensure that a dot-product calculated from a vector which has been subject to the argument reduction instruction will result in no overflows or underflows with an adverse effect on the final dot-product result.

Figure 3:
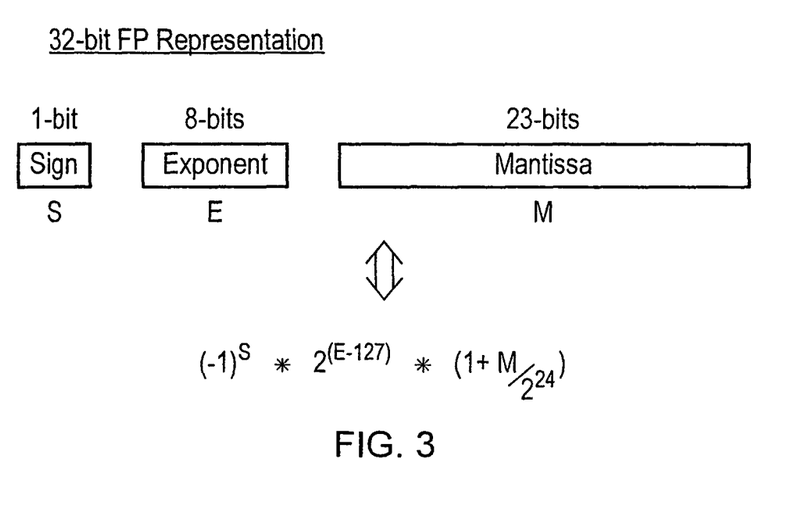
FIG. 3 schematically illustrates a format of a single precision floating point number.

FIG. 3 schematically illustrates the format of a single-precision floating point number. This format will be familiar to those in this technical field. In particular, the floating point single-precision number is a 32-bit number formed of a single bit S representing the sign, eight bits E representing an exponent value (subject to a −127 offset in single-precision) together with a 23-bit mantissa value M (there is a implicit leading 1 within the mantissa. The examples discussed hereafter operate upon single-precision floating point numbers. However, the present techniques are not restricted to such single-precision floating point numbers and may be used, for example with double-precision floating point numbers (or other precision floating point numbers) if desired. Furthermore, the particular format with which a floating point number is represented may also vary although the format shown in FIG. 3 is widely used.

Figure 4:
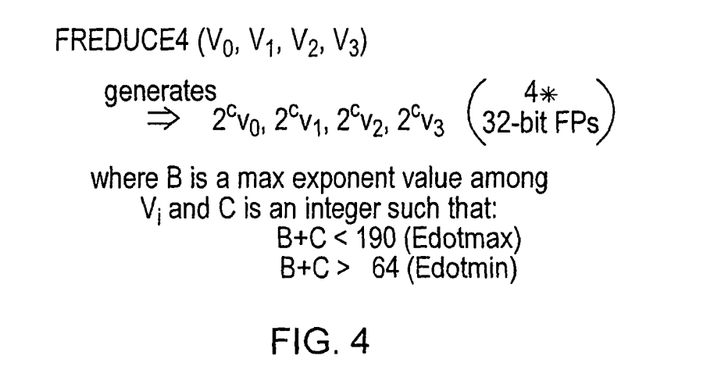
FIG. 4 schematically illustrates the action of a first form of argument reduction instruction.

FIG. 4 illustrates a first example of an argument reduction instruction FREDUCE4. This instruction takes a four component input vector and generates an output with four result components. Each of the result components has been subject to an exponent value shift of C. This corresponds to multiplying each of the input components by a value of $2^C$.

The value selected for C in this argument reduction instruction may vary within a permitted range. Any value of C within this permitted range would be acceptable. This range is delimited by identifying a value B which is a maximum exponent value among the input components and then setting C as an integer such that B+C is less than 190 (corresponding to a value $E_{dotmax}$) and such that B+C is greater than 64 (corresponding to $E_{dotmin}$). The value 190 in this example corresponds to a first predetermined value and the value 64 corresponds to a second predetermined value. The value of C is chosen to be an integer such that B+C lies between the first predetermined value and the second predetermined value.

This sets the magnitude of the largest result component to a range that is safe from overflow and underflow. The end points of the acceptable range may be adjusted in embodiments in which it is desired to protect a dot-product composed of a sum of the multiples of many result components from overflow (this risk increases as the vector length increases).

Figure 5:
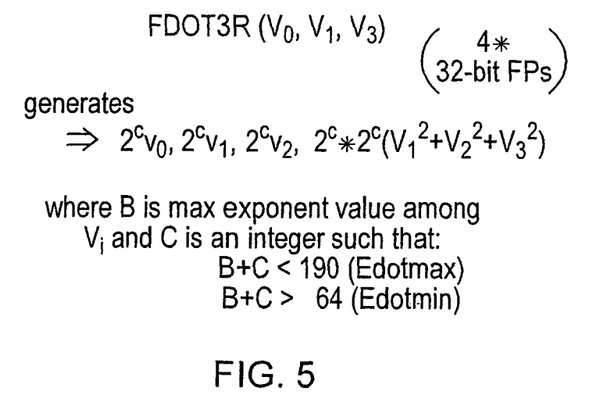
FIG. 5 schematically illustrates the action of a second form of argument reduction instruction.

FIG. 5 illustrates a second example argument instruction reduction FDOT3R. This argument reduction instruction takes a three component input vector and generates three scaled result components together with a dot-product of the scaled result components. The scaling is performed by exponent shifting as previously described with the value C being chosen to ensure that B+C lies within the acceptable range. This variant of the argument reduction instruction FDOT3R which also generates the scalar dot-product of the components is advantageous when that scalar dot-product of the result components is desired for use in subsequent calculation, such as when normalising a three component input vector.

Figure 6:
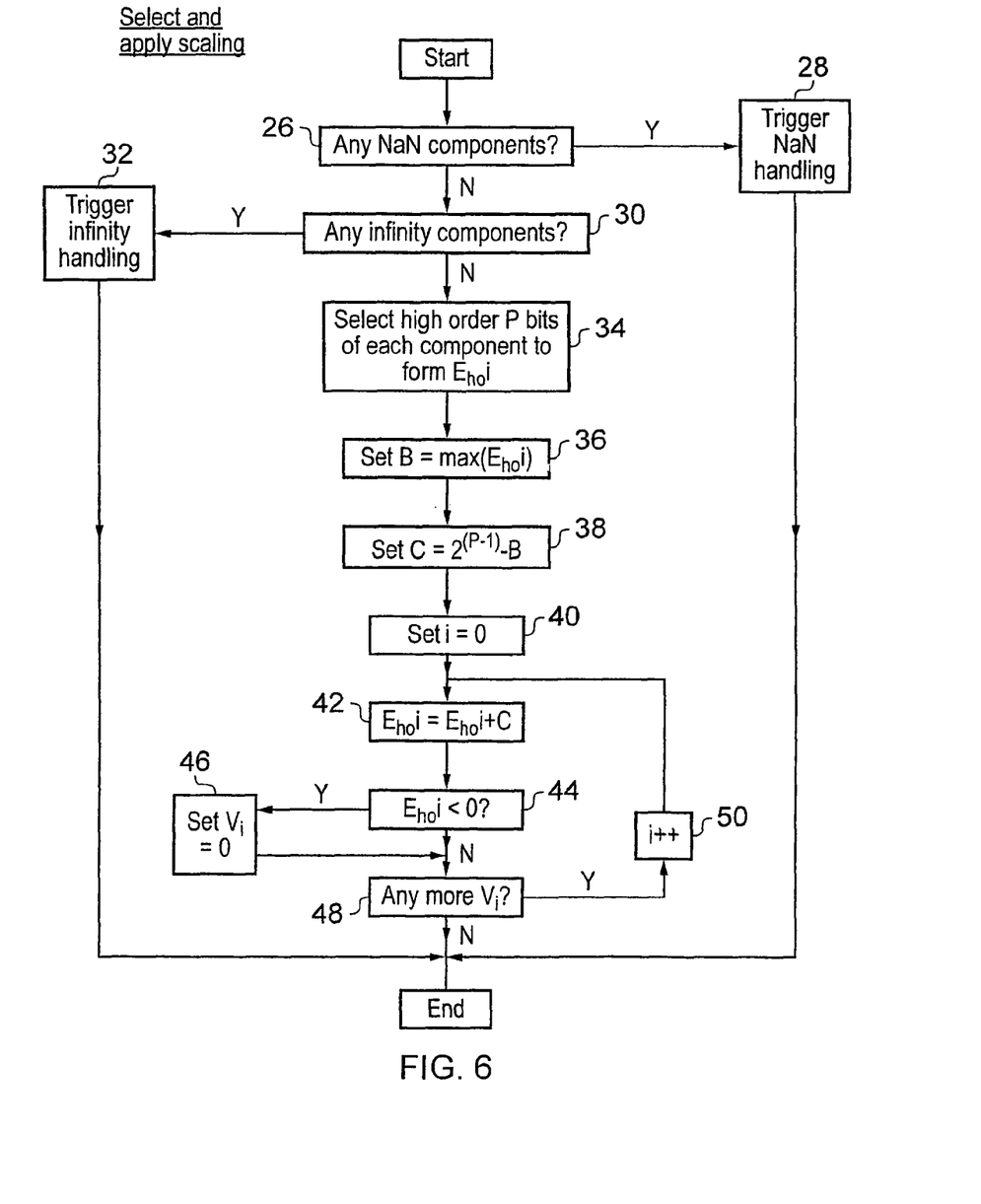
FIG. 6 is a flow diagram schematically illustrating one way of selecting and applying an appropriate level of exponent scaling when executing an argument reduction instruction.

FIG. 6 is a flow diagram schematically illustrating how exponent shift value C (an exponent change value) may be selected and applied in one example embodiment. This example has an advantageously low circuit and power overhead. At step 26 the input vector is checked for any non-a-number components. If any not-a-number components are detected, then not-a-number handling is triggered at step 28 and the execution of the argument reduction instruction is finished. If no not-a-number components are detected at step 26, then step 30 serves to detect whether there are any infinity components within the input vector. If there are any infinity components, then step 32 serves to trigger infinity handling and execution of the argument reduction instruction is completed.

If the input vector is free from not-a-number components and infinity components as checked at steps 26 and 30, then processing proceeds to step 34 where an upper most P bits of the exponent values of each of the input components is extracted to form values $E_{ho}i$. Step 36 then sets a value B to be a maximum of the $E_{ho}i$ values extracted at step 34. Step 38 sets an exponent shift value C to be $2_{(P-1)}$–B. This determined/selected exponent shift (scaling factor) is then applied to all of the input vector components in the remainder of the flow diagram. At step 40 an index value i is set to 0. Step 42 then selects the $E_{ho}i$ value for the vector component corresponding to the current value of i and adds to this the value of C derived at step 38. Step 44 determines if the updated value of $E_{ho}i$ is less than zero. If the value is less than zero, then step 46 sets the corresponding result vector component vi to be zero. If the determination at step 44 is that $E_{ho}i$ is not less than zero or after step 46, then processing proceeds to step 48 where a determination is made as to whether or not there are any more input vector components vi requiring adjustment. If there are further such components, then step 50 increments the value of i and processing returns to step 42.

Figure 7:
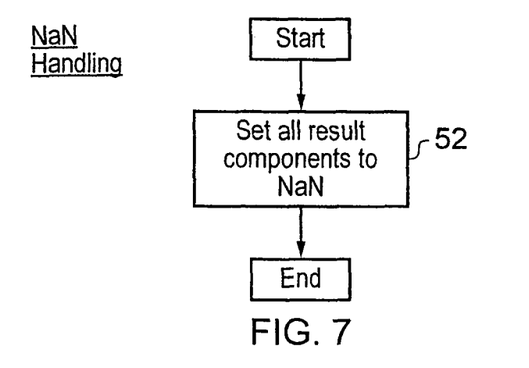
FIG. 7 schematically illustrates not-a-number exception handling.

FIG. 7 illustrates not-a-number exception handling corresponding to step 28 of FIG. 6. The not-a-number handling may be performed by setting all result components to be not-a-number values at step 52.

Figure 8:
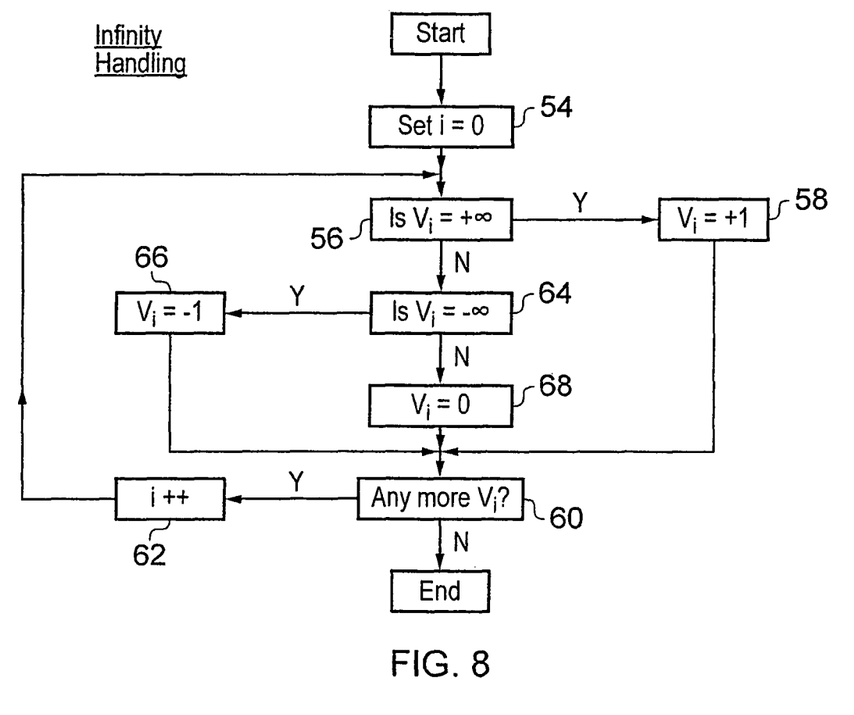
FIG. 8 is a flow diagram schematically illustrating infinity value exception handling.

FIG. 8 is a flow diagram schematically illustrating infinity value exception handling. As will be known to those in this technical field, floating point infinity values may be minus infinity or plus infinity. The overall action of FIG. 8 is to set components corresponding to negative infinity values to be –1 and values corresponding to positive infinity values to be +1. All the other result components which do not correspond to either positive infinity values or negative infinity values are set to have a magnitude of zero.

Step 54 initialise the value of i. Step 56 determines if the input vector component for the current value i is a positive infinity. If a determination at step 56 is that the input vector component is a positive infinity, then step 58 sets the corresponding result vector component to be +1. Processing then proceeds to step 60 where if there are any more input vector components to process, step 62 increments the value of i and processing returns to step 56. If there are no more input vector components to process then the infinity exception handling has completed.

If the determination at step 56 is that the current input vector component vi is not a positive infinity, then step 64 checks to see if this value is a negative infinity. If the value is a negative infinity, then step 66 sets the corresponding result component to –1.

If neither step 56 nor step 64 has detected an infinity value, then step 68 serves to set any non-infinity component within the result vector to have a magnitude of 0.

Figure 9:
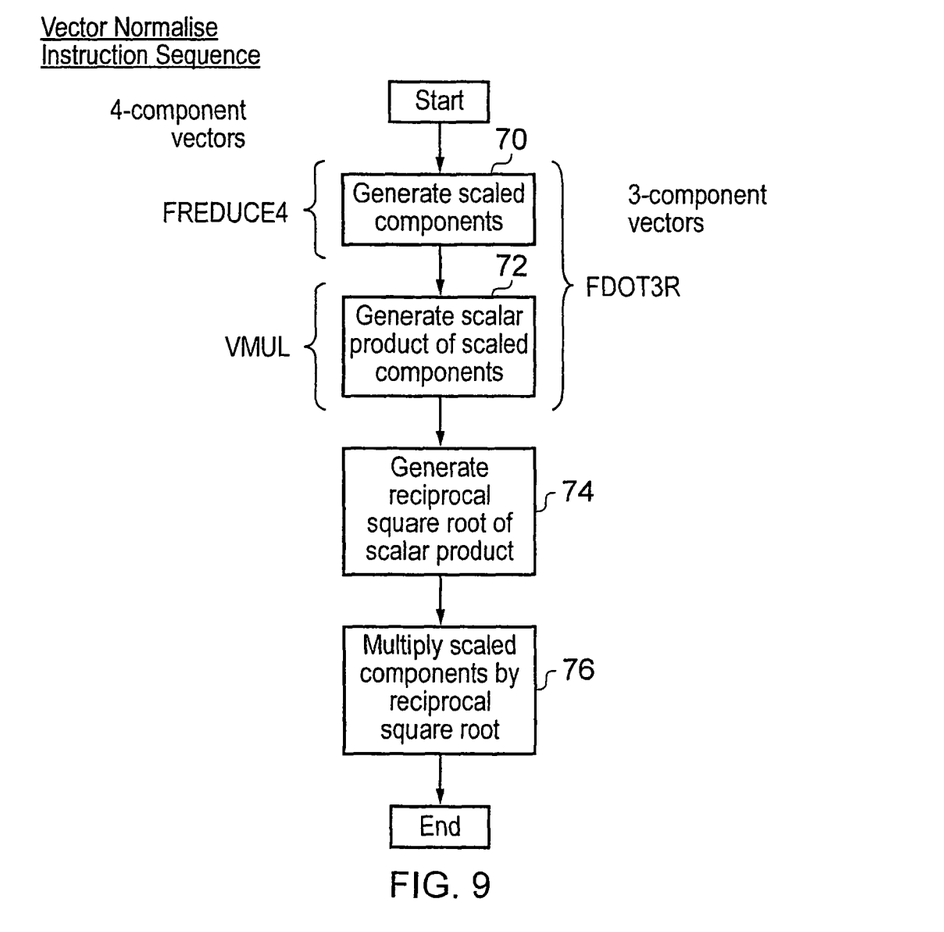
FIG. 9 is a flow diagram schematically illustrating vector normalisation performed using a sequence of program instructions including an argument reduction instruction.

FIG. 9 is a flow diagram schematically illustrating a sequence of instructions which may be executed to perform a vector normalise operation. Step 70 generates scaled vector components (result components). This may be achieved by executing an instruction corresponding to the first example argument reduction instruction FREDUCE4 in the case of a four-component input vector. Alternatively, in the case of a three-component input vector, step 70 may be achieved as part of the execution of the second example argument reduction instruction FDOT3R. The use of the second example of the reduction instruction FDOT3R permits both step 70 and step 72 which generates the scalar product of the scale components (dot-product of the result components) to be calculated with a single instruction. If a four-component vector is being processed, then a separate vector multiply VMUL may be used to calculate the scalar product of step 72.

Step 74 generates a reciprocal square root of the scalar product. Step 76 then multiplies each of the scaled components (result components) by the reciprocal square root value generated at step 76. Comparison of the processing of FIG. 9 with the mathematical illustration of the desired calculation in FIG. 2 will show that the execution of the instruction sequence of FIG. 9 corresponds to a determination of the value illustrated in the final line of FIG. 2.

Figure 10:
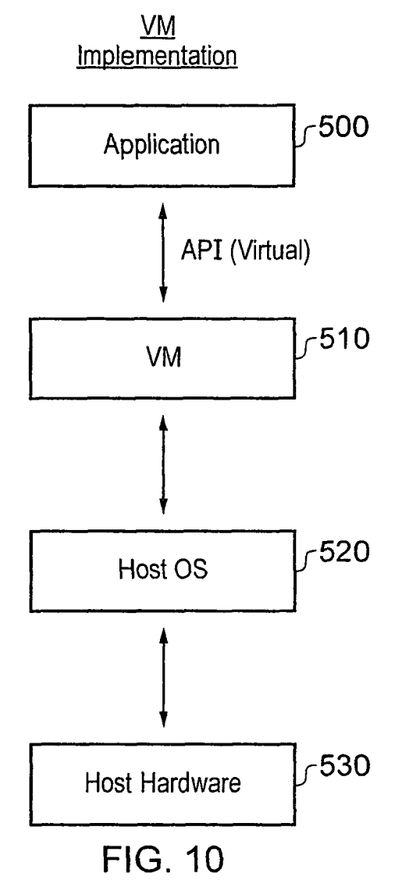
FIG. 10 schematically illustrates a general purpose computer of the type which may be used to provide a virtual machine implementation of the present techniques.

FIG. 10 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
   processing circuitry configured to perform processing operations upon data values; and
   decoder circuitry coupled to said processing circuitry and configured to decode program instructions to generate control signals for controlling said processing circuitry to perform processing operations specified by said program instructions;
   wherein said decoder circuitry is responsive to an argument reduction instruction to generate control signals to control said processing circuitry to perform a processing operation upon a vector floating point value having a plurality of components, each of said plurality of components including an integer exponent value and a mantissa value, said processing operation including generating a plurality of result components, the processing operation comprising:
   for each of said plurality of components, forming a high order exponent portion $E_{ho}$ being an uppermost P bits of said integer exponent value, where P is less than a total number of bits within said integer exponent value, and
   selecting a highest value $E_{homax}$ from among said high order exponent portions $E_{ho}$,
   wherein $E_{homax}$ identifies a highest integer exponent value B of said plurality of components;
   selecting an exponent shift value C such that (B+C) is less than a first predetermined value $E_{dotmax}$ and (B+C) is greater than a second predetermined value $E_{dotmin}$, where said exponent shift value C is an integer value; and
   for each of said plurality of components, if said exponent shift value C is non-zero, then adding a value of $(2^{(P-1)}-E_{homax})$ to said high order exponent portion $E_{ho}$ to generate one of said plurality of result components.

2. Apparatus as claimed in claim 1, wherein said first predetermined value $E_{dotmax}$ is a lowest integer value where a square of a floating point value with an integer exponent value of $E_{dotmax}$ and a mantissa M produces a floating point overflows for at least one value of M.

3. Apparatus as claimed in claim 2, wherein each component has a sign value $S_c$, an integer exponent value $E_c$ and a mantissa value $M_c$ representing a floating point number $(-1)^{S_c} * 2^{(E_c-127)} * (1+(M_c/2^{24}))$ and $E_{dotmax}$ is 190.

4. Apparatus as claimed in claim 1, wherein said second predetermined value $E_{dotmin}$ is a highest integer value where a square of a floating point value with an integer exponent value of $E_{dotmin}$ and a mantissa M produces a floating point underflows for at least one value of M.

5. Apparatus as claimed in claim 4, wherein each component has a sign value $S_c$, an integer exponent value $E_c$ and a mantissa value $M_c$ representing a floating point number $(-1)^{S_c} * 2^{(E_c-127)} * (1+(M_c/2^{24}))$ and $E_{dotmin}$ is 64.

6. Apparatus as claimed in claim 1, wherein for any one of said plurality of components, if when adding said exponent shift value C to an integer exponent value of said component to generate one of said plurality of result components, said one of said plurality of result components is subject to a floating point underflow, then replacing said one of said plurality of result components with a value of zero.

7. Apparatus as claimed in claim 1, wherein for any one of said plurality of components, if when adding said value of $(2^{(P-1)}-E_{homax})$ to said high order exponent portion $E_{ho}$, said value of $(2^{(P-1)}-E_{homax})$ is negative and said adding underflows, then replacing a corresponding one of said plurality of result components with a value of zero.

8. Apparatus as claimed in claim 1, wherein a total number of bits within said integer exponent value is 8 and P=3.

9. Apparatus as claimed in claim 1, wherein if any of said plurality of components is a floating point not-a-number, then all of said plurality of result components are set be floating point not-a-numbers.

10. Apparatus as claimed in claim 1, wherein if any of said plurality of components is a floating point infinity value, then each result component corresponding to a component with a float point infinity value is set to a floating point value with magnitude one and a sign matching said floating point infinity value of said component and all remaining result components are set to have a floating point value with magnitude zero.

11. Apparatus as claimed in claim 1, wherein said argument reduction instruction also generates a result scalar product with a value the same as given by a scalar product of said plurality of result components.

12. Apparatus as claimed in claim 1, wherein said processing circuitry and said decoder circuitry are responsive to said argument reduction instruction followed by a sequence of one or more further instructions to generate a normalised vector floating point value with a plurality of normalised components the same as given by:
   generating a result scalar product with a value the same as given by a scalar product of said plurality of result components;
   generating a reciprocal square root of said result scalar product; and
   for each result component, generating a corresponding normalised component by multiplying said result component by said reciprocal square root.

13. Apparatus as claimed in claim 1, wherein said processing circuitry and said decoder circuitry are part of a graphics processing unit.

14. A virtual machine comprising computer including a non-transitory computer readable storage medium storing a program which, when implement by the computer, provides an apparatus for processing data as claimed in claim 1.

15. Apparatus for processing data comprising:
   processing means for performing processing operations upon data values; and
   decoder means for decoding program instructions to generate control signals for controlling said processing circuitry to perform processing operations specified by said program instructions;
   wherein said decoder means is responsive to an argument reduction instruction to generate control signals to control said processing means to perform a processing operation upon a vector floating point value having a plurality of components, each of said plurality of components including an integer exponent value and a mantissa value, said processing operation including generating a plurality of result components, the processing operation comprising:
   for each of said plurality of components, forming a high order exponent portion $E_{ho}$ being an uppermost P bits of said integer exponent value, where P is less than a total number of bits within said integer exponent value, and
   selecting a highest value $E_{homax}$ from among said high order exponent portions $E_{ho}$, wherein $E_{homax}$ identifies a highest integer exponent value B of said plurality of components;

selecting an exponent shift value C such that (B+C) is less than a first predetermined value $E_{dotmax}$ and (B+C) is greater than a second predetermined value $E_{dotmin}$, where said exponent shift value C is an integer value; and for each of said plurality of components, if said exponent shift value C is non-zero, then adding a value of $(2^{(P-1)} - E_{homax})$ to said high order exponent portion $E_{ho}$ to generate one of said plurality of result components.

16. A method of processing data comprising the step of:

in response to decoding an argument reduction instruction by decoding circuitry, performing, by processing circuitry, a processing operation upon a vector floating point value having a plurality of components, each of said plurality of components including an integer exponent value and a mantissa value, said processing operation including generating a plurality of result components, the processing operation comprising:

for each of said plurality of components, forming a high order exponent portion $E_{ho}$ being an uppermost P bits of said integer exponent value, where P is less than a total number of bits within said integer exponent value, and selecting a highest value $E_{homax}$ from among said high order exponent portions $E_{ho}$, wherein $E_{homax}$ identifies a highest integer exponent value B of said plurality of components;

selecting an exponent shift value C such that (B+C) is less than a first predetermined value $E_{dotmax}$ and (B+C) is greater than a second predetermined value $E_{dotmin}$, where said exponent shift value C is an integer value; and for each of said plurality of components, if said exponent shift value C is non-zero, then adding a value of $(2^{(P-1)} - E_{homax})$ to said high order exponent portion $E_{ho}$ to generate one of said plurality of result components, and wherein the above steps are implemented on a data processing apparatus.

17. A computer program product having a non-transitory form and storing a computer program for controlling a data processing apparatus to perform data processing in response to program instructions, wherein said computer program includes an argument reduction instruction for controlling processing circuitry of said data processing apparatus to perform a processing operation upon a vector floating point value having a plurality of components, each of said plurality of components including an integer exponent value and a mantissa value, said processing operation including generating a plurality of result components, the processing operation comprising:

for each of said plurality of components, forming a high order exponent portion $E_{ho}$ being an uppermost P bits of said integer exponent value where P is less than a total number of bits within said integer exponent value, and selecting a highest value $E_{homax}$ from among said high order exponent portions $E_{ho}$, wherein $E_{homax}$ identifies a highest integer exponent value B of said plurality of components;

selecting an exponent shift value C such that (B+C) is less than a first predetermined value $E_{dotmax}$ and (B+C) is greater than a second predetermined value $E_{dotmin}$, where said exponent shift value C is an integer value; and for each of said plurality of components, if said exponent shift value C is non-zero, then adding a value of $(2^{(P-1)} - E_{homax})$ to said high order exponent portion $E_{ho}$ to generate one of said plurality of result components.

* * * * *